F. F. WEAR & B. M. ELY.
COFFEE MILL.
APPLICATION FILED NOV. 14, 1914.
1,220,147.
Patented Mar. 20, 1917.
4 SHEETS—SHEET 4.
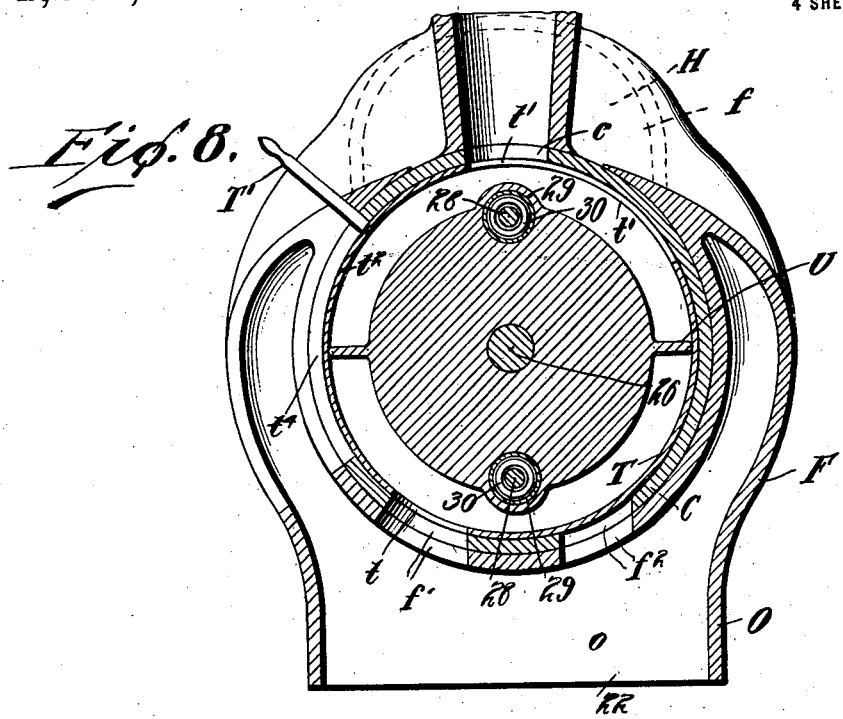
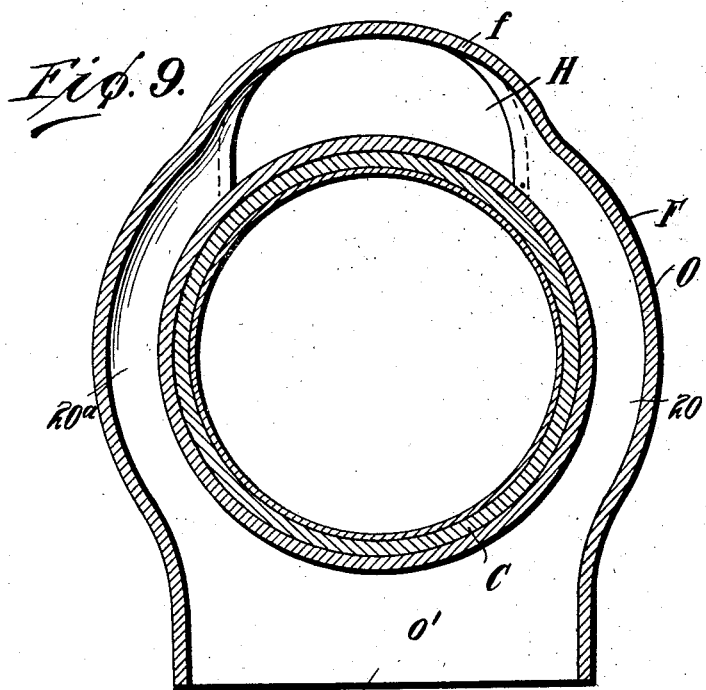
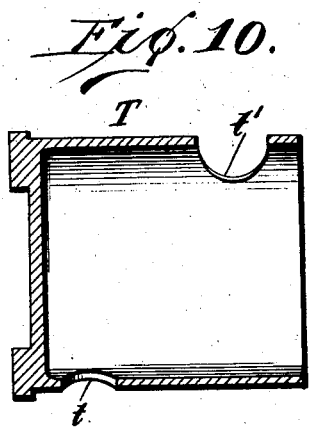
Witnesses
W. C. Fielding
A. Stockman
Inventors
Frank F. Wear & Bernard M. Ely
By
C. J. Stockman
Attorneys

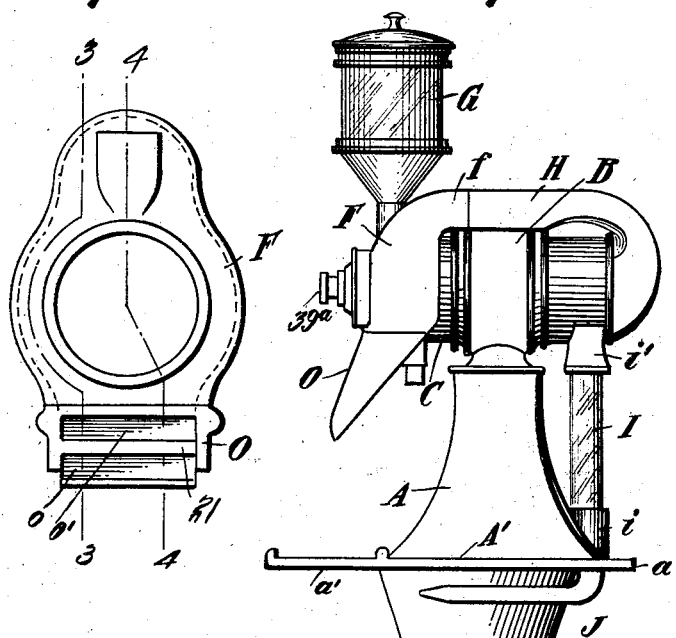

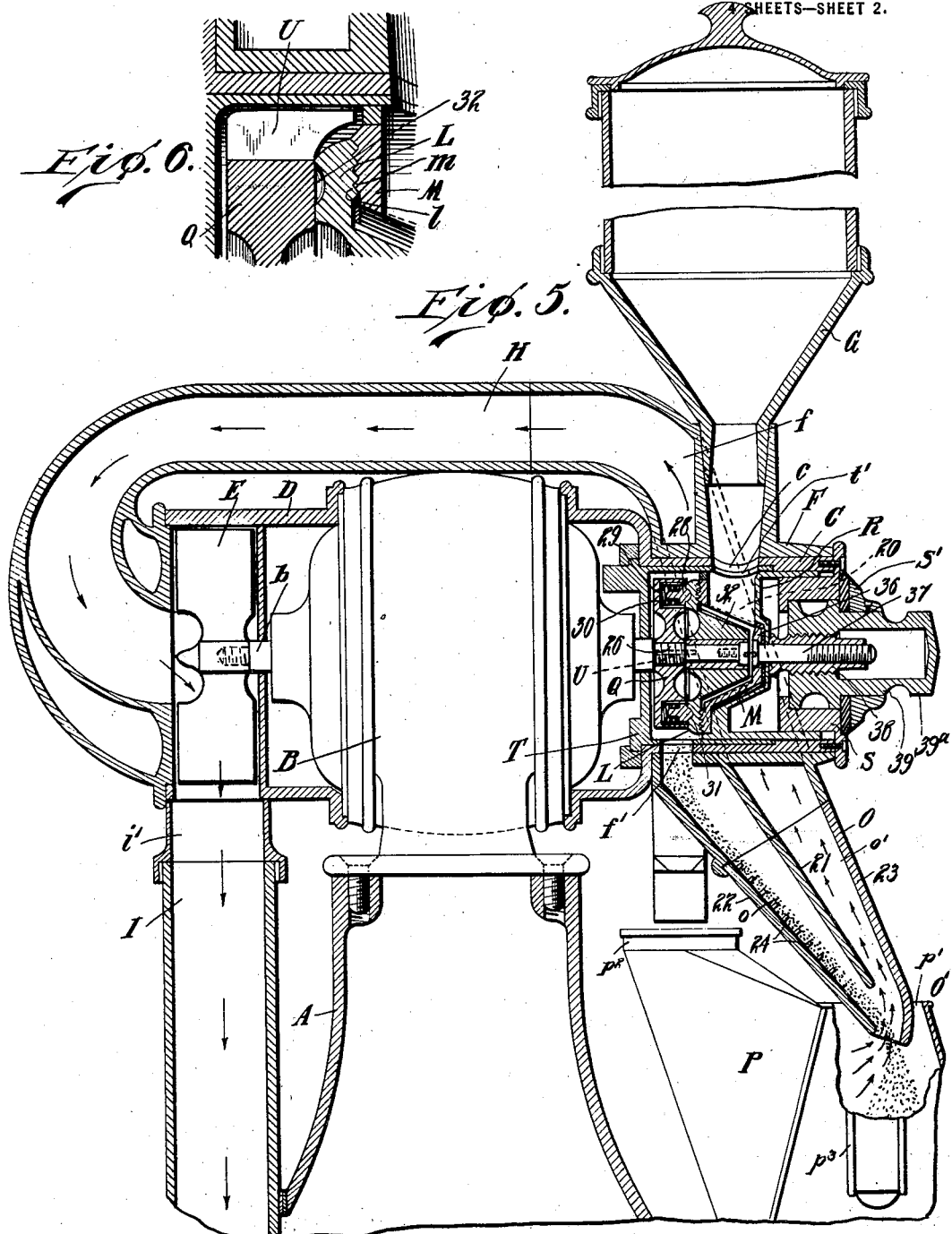

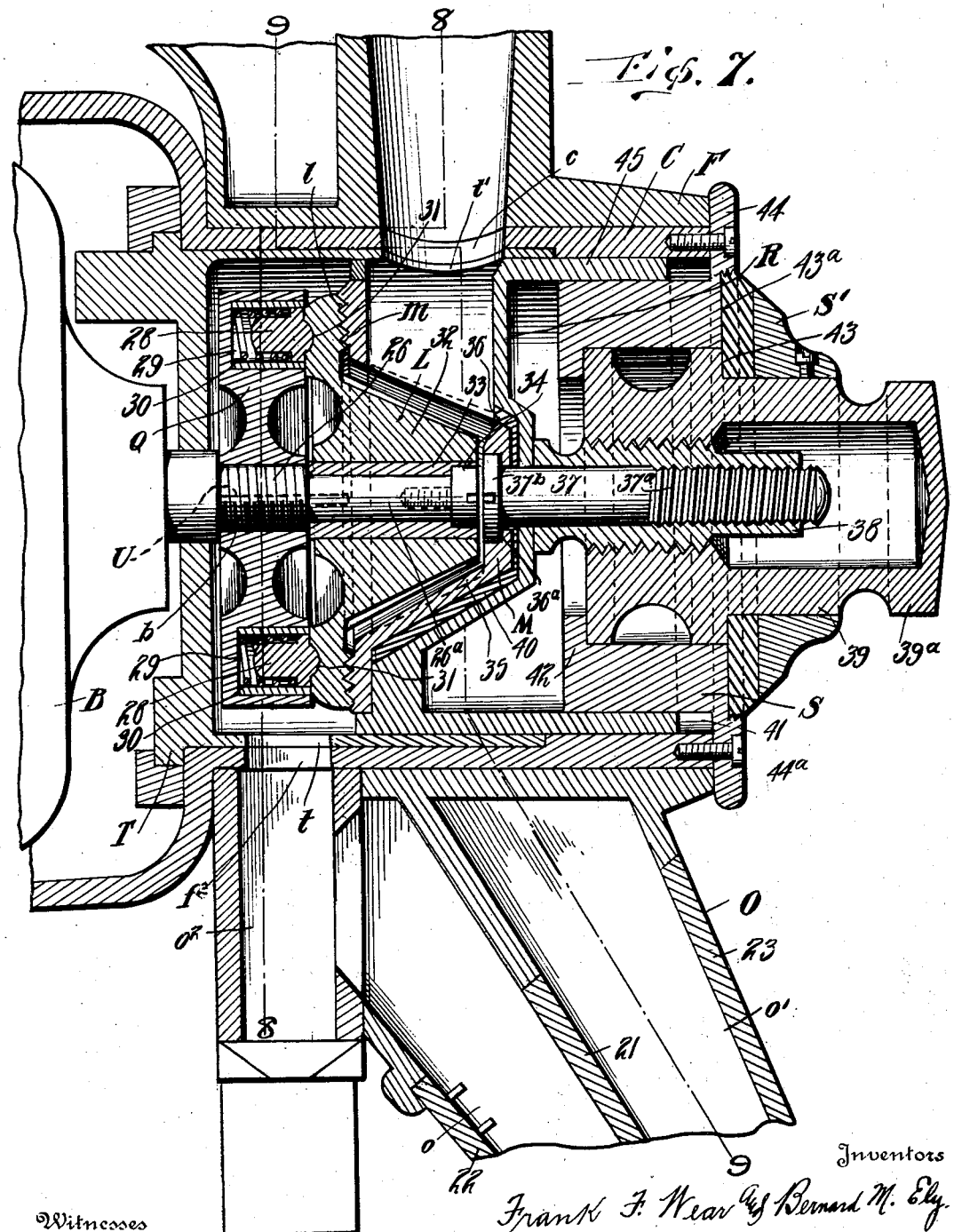

UNITED STATES PATENT OFFICE.

FRANK F. WEAR AND BERNARD M. ELY, OF CINCINNATI, OHIO, ASSIGNORS TO THE ALVEY-FERGUSON COMPANY, OF CINCINNATI, OHIO, A CORPORATION OF OHIO.

COFFEE-MILL.

1,220,147.     Specification of Letters Patent.     Patented Mar. 20, 1917.

Application filed November 14, 1914. Serial No. 872,186.

*To all whom it may concern:*

Be it known that we, FRANK F. WEAR and BERNARD M. ELY, citizens of the United States, residing at Cincinnati, in the county of Hamilton and State of Ohio, have invented new and useful Improvements in Coffee-Mills, of which the following is a specification.

This invention has particular reference to a coffee mill having means for creating a current of air so associated with the grinding elements of the mill that the ground product will be delivered free from chaff, dust and dirt: the improvements herein contemplated having special reference to a novel correlation of parts whereby, among other things, the mill is caused effectively to grind the berries and separate the chaff, dust and dirt therefrom.

Other particular purposes of the invention are to so correlate parts as to produce a mill of most simple construction and pleasing appearance for grinding the berries and removing the impurities from the ground product and which mill contains most practicable provision for the relative adjustment of the grinding elements in order to variably regulate the fineness of the grind, and in which the running and adjustable parts will be most effectively alined and maintained in alinement, and in which provision is made for the production of a pulverized product without loss of the coffee due to its being carried off when in pulverized condition with the chaff, dust and dirt which the mill separates from the coffee.

The accompanying drawings illustrate a mill which embodies a construction and correlation of parts such as to carry into practice in a most satisfactory way, the foregoing purposes, and other purposes which will hereinafter appear: and, in said drawings, wherein like characters of reference denote corresponding parts in the several views:

Figure 1 is a side elevation of a mill embodying the improvements constituting the present invention;

Fig. 2 is an end view of the head forming a part of said mill;

Fig. 3 is a vertical section on the line 3—3 of Fig. 2;

Fig. 4 is a vertical section on the line 4—4 of Fig. 2;

Fig. 5 is a vertical section through the entire mill with the parts arranged to discharge the ground product into the main coffee channel and to cause it to be subjected to force of the air which it utilizes to remove the impurities therefrom;

Fig. 6 is a detail section showing one of the fan blades or scrapers extending from a certain backing plate used in connection therewith, as hereinafter described;

Fig. 7 is a vertical section through a part of the mill, drawn to a larger scale than any of the preceding figures, showing the parts arranged to cause the ground product to be discharged into the auxiliary channel, wherein it is not subjected to the action of the air which separates the impurities therefrom;

Fig. 8 is a vertical section on the line 8—8 of Fig. 7;

Fig. 9 is a section on the line 9—9 of Fig. 7;

Fig. 10 is a detail sectional view of the valve by which the discharge of the coffee into the main and auxiliary conduit is selectively controlled.

A designates a base which supports a motor B. The base and motor may be of any suitable construction or kind, but it is preferred that the base be provided with a bottom plate A' having extensions $a$ and $a'$ projecting in opposite directions from the lower end of the base A and that the motor be of an electrical nature.

From one end of the casing of the motor there extends a sleeve or casing member C a part of which forms the grinding chamber, the grinding being effected in that part of the sleeve which encircles the burs hereinafter referred to. A sleeve or casing member D extends from the other end of the motor casing and is formed to provide a chamber for a fan E which is driven by the motor B, being suitably connected to the shaft $b$ of the motor. Mounted on the sleeve C is a head F to which is connected a hopper G, the sleeve and head having registering openings, shown at $c$, through which coffee berries flow from the hopper into the grinding chamber C.

A conduit H extends from the head F back to the fan chamber D and the head is formed with channels 20 and $20^a$ respectively, which extend around the grinding chamber C and have communication with said conduit H, the head F preferably having a rearward extension $f$, which is common to both channels 20 and 20$^a$ and opens into the conduit H.

I designate a conduit which extends from the pressure side of the fan casing D to a nozzle J which enters a separating chamber K having an outlet $k$ of greater diameter than its inlet, the inlet being formed by the nozzle J.

The grinding elements comprise a runner bur L and a stationary bur M.

The head F also has a spout O which comprises two channels, marked $o$ and $o'$, respectively, separated from each other throughout a part of the length of the spout by a partition 21. These channels meet at the lower terminal of the partition 21 and form what is herein termed the mouth of the spout, the said mouth being marked O'. The channel $o$ has communication with the grinding chamber C through registering openings (shown at $f'$) formed in the sleeve C and head F, and said channel conveys the ground material, which includes the coffee and the impurities, to the mouth O', the said impurities comprising the dust, dirt and chaff which are to be removed from the coffee. The channels 20 and 20$^a$ in the head have their lower ends in direct communication with the channel $o'$ in the spout and their upper ends have communication with the fan casing D through the conduit H. Hence a current of air is induced through the mouth O' and in the channel $o'$.

It will be noted that the correlation of parts thus far described, is such that the coffee berries pass from the hopper G into the grinding chamber wherein they are subjected to the action of the grinding burs L and M, the ground coffee with the chaff and dirt passing down the channel $o$ and into the mouth O', and while passing through said mouth meeting a current of air induced by the fan E. The current of air passing through the body of ground coffee raises the lighter particles—which comprise the dust, dirt and chaff and are herein called "impurities" and conveys the same through the channels $o'$, 20 and 20$^a$ and conduit H to the fan casing E. The impurities thus removed from the ground coffee are forced with the air out of the fan casing and enter the conduit I through which they flow under pressure into the nozzle J. This nozzle is arranged tangentially with relation to the separating chamber K so that the impurities—which are heavier than the air—are thrown out centrifugally toward the wall of the chamber, the air and the impurities traveling separate spiral courses within the separating chamber to the outlet $k$. As this outlet is of greater diameter than the inlet to the chamber, the pressure of the air is reduced in the separating chamber and its speed is thereby checked. The friction of the impurities against the wall of the separating chamber and its movement in a long spiral course, substantially outside the area of movement of the air results in the checking of the speed of the impurities. Hence, the air and the impurities escape quietly from the separating chamber and the impurities instead of being blown out into the atmosphere are quietly deposited, preferably in a receptacle, not shown, provided to receive the same. In order to permit the proper deposition of the impurities the separating chamber is preferably tapered from its receiving end to its outlet and in order that the course of the impurities therein may be observed it preferably comprises a section $k'$, which is made of glass or other suitable transparent material. It is also desirable that the course of the air with the entrained impurities may be observed and for this reason it is preferred to form the conduit I of a suitable transparent material, as glass. This conduit I has its opposite ends preferably mounted in bosses $i$ and $i'$ with which the base A and sleeve D respectively are provided. The upper end of the nozzle J enters the boss $i$, and the separating chamber K is secured to the bottom plate A' of the base A in any suitable way. The portion $a'$ of the bottom plate A' provides a support for the can P which receives the ground and cleaned coffee.

It will be noted that the rear wall 22 of the spout O is inclined and that the front wall 23 of said spout also is inclined, these walls forming the rear wall of the channel $o$ and the front wall of the channel $o'$ respectively. It will further be noted that the partition 21 arranged between said channels is also inclined and that its lower terminal is spaced from the lower terminal of the rear wall 22 and is substantially in vertical alinement with the latter terminal; while the front wall 23 has its lower end arranged below the lower terminal of the partition 21 and extends toward the rear wall 22 and terminates approximately in the horizontal plane of the lower terminal of the latter. The space below the partition 21 and between the lower ends of the front and rear walls 22 and 23 form the mouth O' hereinabove referred to, the said mouth being common to the channels. Within this mouth the separation is effected. It will be noted that the relative position of the lower end of the walls and partitions causes the unseparated material to flow across the mouth O' and the flow of the air to be transversely through the descending material, whereby a current of air of a certain pressure may more effectively separate the impurities from the coffee than when said current flows longitudinally through a body of descending ground material, because it is enabled to reach the various parts of the mass of descending coffee and impurities much more certainly. In other words, it is practicable with the particular correlation of parts set forth to cause an effective separation of the coffee and impurities with the use of air at a lower pressure than would be the case where the course of the air is longitudinally through the body of descending material. The relative courses of the air and ground material are indicated in Fig. 5 by arrows and dots, the dots indicating the course of the ground material and the arrows indicating the course of the air.

In order that this relative flow of the unseparated material and the air may be most advantageously produced, the rear wall 22 and the front wall 23 are synclinally arranged, the partition 21 is disposed inclinatorily with its lower edge substantially in vertical alinement with the lower edge of the rear wall and the front wall 23 has its lower portion curved toward the rear wall and extending over the longitudinal plane of the partition 21 and terminating approximately in the longitudinal plane of the rear wall. To further conduce to an effective separation of the impurities from the coffee by the use of a current of air at lower pressure than otherwise would be required, the material is caused by suitable obstructions—such as the pins 24, for example, on the rear wall 22—to spread out laterally while passing through the channel O' into approximately a fan shape so that it flows in a comparatively thin stream across the outlet from said mouth until it strikes the lower end of the front wall 23.

The motor B has a long shaft 26 which projects forward therefrom into the sleeve C and is arranged in the axial center of the latter. The rotating bur L is mounted on the shaft 26. Suitable means are provided whereby injury to the teeth of the bur are prevented when a nail, stone or other hard obstruction gets between the burs. Preferably, the means referred to is of a nature such as that when a hard foreign substance gets between the burs, the rotation of the runner bur is instantly stopped and the said bur is caused to remain stationary until the obstruction is removed. The means herein exemplified for the purpose includes a back plate Q which is fixedly secured to the shaft 26—the runner bur being loose with relation to the shaft. The said back plate is provided with any suitable number of plungers 28 which are mounted in sockets 29 formed in the back plate and are pressed outward by springs 30 so that their heads normally protrude therefrom. The protruding portions of the plungers are arranged to be seated in cavities 31 formed in the runner bur L and when thus seated in said runner bur the back plate Q communicates the motion of the shaft 26 to the runner bur. In the normal operation of the machine the back plate is connected to the runner bur in the manner set forth, but when a hard foreign substance gets between the burs it locks the runner bur and the stationary bur together, the resistance afforded by such substance to the rotation of the runner bur being sufficient to cause the springs 30 to yield, the plunger thereby being permitted to release the runner bur, the latter being now held against rotation by the hard foreign substance.

The runner bur L has a long bearing portion 32 which is provided with an axial sleeve 33, mounted on a reduced portion 26ª of the shaft 26. The said shaft including this reduced portion extends approximately half way the length of the sleeve C and has at its outer end a head 34 which is received by a seat formed in the outer end of the sleeve 33. It will be noted that the reduced portion 26ª of the shaft 26 is eccentric and that the sleeve 33 is eccentrically bored to receive said reduced portion. This provides an increased thickness in the part of the sleeve 33 which receives the strains due to the preliminary crushing of the coffee berries between the burs L and M and also enables the runner bur L to be accurately adjusted with respect to the shaft 26, so that the center of gravity of the runner bur coincides with the axis of rotation of the shaft. This adjustment is accomplished by adjusting the sleeve 33 on the shaft portion 26ª until the center of gravity and axis of rotation coincide and then clamping the sleeve in position by the screw 34.

The back plate Q is fixedly secured to the thicker part of the shaft 26 in any suitable way. It is herein shown as being threaded upon said shaft in order that it may be adjusted to take up wear and may be fixedly held in adjusted position. The bearing portion 32 of the bur L is externally tapered and preferably fluted, and coöperates with the correspondingly hollow, tapered and internally fluted part 35 of the stationary bur M to initially break the coffee berries, the latter being further ground between the toothed portions $l$ and $m$ of the burs.

The fixed bur M is mounted on a stub shaft 37, which engages the outer end wall 36 thereof and is arranged in an endwise relation to the shaft 26 and extends from the inner end of the latter outward through the outer end of the sleeve C. Fixedly secured to the shaft 37, as by the threads 37ª for example, is a sleeve 38, the outer surface of which is threadably engaged with an adjusting nut 39 having a gripping portion or head 39ª outside the sleeve C. Between the inner end of the sleeve 38 and the end wall 36 of the stationary bur M is a backing member R which is formed to provide a seat whose shape corresponds to the shape of the stationary bur and receives the latter, a packing of Babbet metal or other suitable material, shown at 40, being preferably interposed between the stationary bur and backing plate. The shaft 37 has a head $37^b$ at its inner end and this head is received by a recess $36^a$ formed in the wall 36 of the stationary bur M, the said wall, backing plate and the interposed metal packing being fixedly secured together by adjustment of the screw shaft 37, for example.

S designates a guide sleeve which is mounted in the outer end of the sleeve C and has its outer longitudinal surface spaced (as shown at 41) from the inner longitudinal surface of the latter. The inner end of the guide sleeve is provided with an inwardly extending annular flange 42 which coöperates with a holding member S' mounted on the outer portion of the adjusting nut to hold said adjusting nut against longitudinal movement when it is turned on the sleeve 38. The outer end portion of the adjusting nut 39 is preferably of lesser diameter than the inner end thereof, forming a shoulder 43, and the outer surface of the guide sleeve S is preferably formed with an axial recess $43^a$ and with an outwardly extending annular flange 44. The flange 44 is preferably secured to the end of the sleeve C—by screws $44^a$, for example.

The backing member R is provided with an annular longitudinal flange 45 which extends into the space 41 between the body of the guide sleeve S and the sleeve C, this annular flange thereby, in conjunction with the guide sleeve S and sleeve C, serving to prevent axial displacement of the backing member and parts connected thereto, the said parts including, as will be noted, the stationary bur.

It will be noted that the parts are so correlated that by manipulating the adjusting nut 39 the stationary bur M will be adjusted toward or away from the runner bur L in order to regulate the fineness of the grind, and that in this adjustment of the parts the backing plate moves with the stationary bur and guides it in its movement.

It will be further noted that as the runner bur L is supported by the motor shaft to rotate concentrically in the chamber formed by the sleeve C and the stationary bur M is supported by the flange 45 concentrically in said chamber, the runner bur and stationary bur will at all times be held in perfect alinement no matter what the adjustment of the stationary bur may be with relation to the runner bur.

It is desirable at times, and particularly when a powdered coffee is wanted, to provide means whereby the ground and cleaned coffee may be passed through the grinding portion of the mill without being subjected to the action of the current of air induced by the fan while passing through the spout. In other words, when it is desired to produce a powdered product the particles of which might be of a weight which would cause them to be carried away with the air, it is desirable first to pass the coffee through the apparatus and subject it to a preliminary grinding during which it is subjected to the influences of the current of air heretofore referred to, the cleaned coffee passing out through the channel o as hereinbefore set forth, and then, after adjustment to produce a finer grind, pass the coffee again through the mill, but cause it after leaving the bur to traverse a course wherein it is not subjected to the influences of the air. For this reason the spout O is provided with a supplementary channel $o^2$ which has communication with the grinding chamber through registering openings in the head F and sleeve C, as indicated at $f^2$ in Fig. 7. In order to control the course of the ground coffee from the grinding chamber C the latter is provided with a valve T so correlated with the sleeve C and head F as to control the outlet of the coffee from the grinding chamber by permitting the coffee to flow either through the registering openings $f'$ in the channel o of the spout or through the registering openings $f^2$ into the supplementary channel $o^2$. This valve is preferably cup-shaped, as shown, and preferably is formed with an opening $t$ which registers with the openings $f'$ in one position of the valve and with the openings $f^2$ in another position of the valve. It also has means for controlling the supply of the coffee berries to the grinding chamber. The latter means may desirably comprise a long opening $t'$ so arranged that the inlet to the grinding chamber is open when the valve is turned in either of its beforementioned positions. In addition to the foregoing it will be noted that the valve has a solid wall, indicated at $t^2$ in Fig. 8, so arranged as to permit the valve to close the inlet to the grinding chamber whenever desired. Further, it will be noted that the valve extends into the grinding chamber and closes one end thereof.

In order that this valve may be conveniently manipulated it is provided with a handle T' which extends to the outside of the mill, through openings (shown at $t^4$ in Fig. 8) formed in the sleeve C and head F.

It will be noted that when the valve is turned so that its interior is in communication with the registering openings $f'$ the ground coffee is caused to pass through the channel o and to be subjected to the force of the air in the mouth O' of the spout O as hereinbefore described, and that when the valve is turned to close the opening $f'$ and open the opening $f^2$ the ground coffee is caused to pass into the supplementary channel $o^2$ and to be thus discharged without coming under the influence of the current of air induced by the fan E.

When the coffee passes through the channel $o$ it enters the receptacle P through an opening $p'$ formed in the upper end of the latter and when it is discharged through the supplemental channel $o^2$ it enters said receptacle P through a separate opening in the part $p^2$ of the latter, the said part $p^2$ serving also as a spout through which the coffee may be conveniently discharged into a bag or other container from the receptacle, and the receptacle P having a handle at its side, as shown at $p^3$, for convenience in turning it to cause the discharge of its contents through the part $p^2$.

In order effectively to cause the discharge of all the ground material toward the grinding chamber and to keep said grinding chamber clean at all times the rotary back plate Q is provided with radially arranged wings or ears U shown best in Fig. 6 and indicated in dotted outline in Figs. 5 and 7. These radially arranged wings or ears preferably project over the peripheral surface of the part $m$ of the rotary bur approximately to the vertical plane of the teeth of said bur. Their longitudinal edges are adjacent to the inner surface of the cup-shaped valve T and they are caused by the rotation of the back plate Q to rub the ground material from the surface of the valve and at the same time they serve to create a current of air which forces the material through the outlet, in the latter respect acting like fan blades.

In practice, it is preferred to form the spout O of two sections arranged end to end, the upper section being integral with the head F and the lower section being separate therefrom and suitably secured to the lower edge of the upper section, as shown in Figs. 5 and 7.

It is believed that the construction, operation and advantages of our improved mill will be readily understood from the foregoing description: and we would have it understood that the construction herein illustrated and particularly described is merely intended to exemplify what is at present regarded to be the preferred embodiment of the invention, and that the invention may be otherwise and variously embodied without departing from its spirit or the scope of the subjoined claims.

Having now described the invention what we believe to be new and desire to secure by Letters Patent is:—

1. In combination, a support, driving means supported thereby, a grinding chamber at one side of the driving means, grinding elements in the grinding chamber, one of said grinding elements being rotatable, a fan, connections between the driving means and the rotatable grinding element and fan, a spout having a discharge channel for the ground material from said chamber and an air channel connected to said fan, said spout being constructed to create a flow of air transversely across the path of the discharge from the discharge channel.

2. In combination, a support, driving means supported thereby, a grinding chamber at one side of the driving means, grinding elements in the grinding chamber, one of said elements being rotatable, connections between the driving means and the rotatable grinding element, an internally channeled head mounted on the grinding chamber, a spout connected to the head and having a discharge channel for the ground material from said chamber and an air channel connected to said channeled head, means for creating a flow of air through the air channel and channeled head, said spout being constructed to direct such flow of air transversely across the path of the discharge from the discharge channel.

3. In combination, a support, driving means supported thereby, a grinding chamber at one side of the driving means, grinding elements in the grinding chamber, one of said grinding elements being rotatable, a fan at the other side of the driving means, connections between the driving means and the rotatable grinding element and fan, a channeled head mounted on the grinding chamber and having a spout provided with a discharge channel for the ground material from said chamber and an air channel connected to said channeled head, an air conducting means connecting said fan and channeled head to create a flow of air through the air channel, said spout being constructed to direct such flow of air transversely across the path of the discharge from the discharge channel.

4. In combination, a grinding mechanism, a receptacle for ground material, an air passage through a portion of which the ground material passes on its way to the receptacle and means for conducting the material from the grinding mechanism to the receptacle, said means being arranged to discharge the material obliquely and entirely across the air passage and means for creating a current of air in said air passage.

5. In a device of the character described, the combination with a grinding mechanism of a spout comprising an air channel and a discharge channel for ground material, means for inducing a current of air in the air channel, said channels converging toward their lower ends and said spout having a mouth common to both of said channels into which the ground material is discharged transversely and entirely across the current of air.

6. In combination, a grinding mechanism, a spout having a passage for the ground material and a separate passage for air, the spout having at its extremity a mouth common to said passages, said mouth having an opening at the point of final discharge of the material from the spout and through which opening the air enters the spout, said mouth having its walls correlated to cause the ground material to be discharged obliquely across the opening, and means for inducing a current of air through said opening, mouth and air passage.

7. In combination, a grinding chamber, grinding elements therein, a spout having walls and a partition intermediate said walls, the said walls and partition being relatively arranged to provide a first channel and a second channel separated from each other, the first channel being in communication with the grinding chamber, and means for inducing a current of air through the second channel, the partition having its lower edge spaced from the lower edges of said walls, the lower portions of the walls extending below the horizontal plane of the lower edge of the partition and forming a mouth which is arranged between said lower portions and below the partition, said lower portions being spaced from each other to provide an opening to said mouth, the said portions of the walls below the partition being relatively so arranged that the material will flow across the opening to the mouth and the induced current of air will flow into the mouth through said opening and transversely through the material.

8. In combination, a grinding chamber, grinding elements therein, a spout having walls and a partition intermediate said walls, the said walls and partition being relatively arranged to provide a first channel and a second channel separated from each other, the first channel being in communication with the grinding chamber, and means for inducing a current of air through the second channel, the partition having its lower edge spaced from the lower edges of said walls, the lower portions of the walls extending below the horizontal plane of the lower edge of the partition and forming a mouth which is arranged between said lower portions and below the partition, said lower portions being spaced from each other to provide an opening to said mouth, the wall of the first channel over which the unseparated material passes being inclined to direct the material across the mouth and the wall of the second channel being arranged to cause the air to flow transversely through the material in the mouth.

9. In combination, a grinding chamber, grinding elements therein, a spout having walls and a partition intermediate the walls, the said walls and partition being arranged to provide separated channels extending longitudinally of the spout and a mouth at the lower end of said channels, the mouth being common to both channels and the spout having an opening between the mouth and the atmosphere, one of said channels having communication with the grinding chamber and serving to conduct the unseparated material to the mouth and having its wall inclined to direct the material across the mouth, and means for inducing a current of air through the mouth and through the other channel, the wall of the latter channel being arranged to cause the current of air to flow transversely through the material crossing the mouth.

10. In combination, a grinding chamber, grinding elements therein, a spout having walls and a partition intermediate the walls, the said walls and partition being inclined and relatively arranged to form separated channels extending longitudinally of the spout and a mouth at the lower end of said channels, the mouth being common to both channels, one of said channels having communication with the grinding chamber and serving to conduct the unseparated material to the mouth and being provided with means for causing the material to spread out in its passage to the mouth, and means for inducing a flow of air through the other channel, the wall of the latter channel having its lower portion extending across the longitudinal plane of the partition and terminating approximately in the longitudinal plane of the rear wall.

11. In combination, a support, driving means supported thereby, a grinding chamber at one side of the driving means, grinding elements in the grinding chamber, a fan, one of said grinding elements being rotatable, connections between the driving means and the rotatable grinding element and fan, a channeled head mounted on the grinding chamber, a conduit extending from the head to the fan, and a spout connected to said head and provided internally with a plurality of separated channels and a mouth common to said channels, one of the channels having communication with the grinding chamber and the other having communication with the conduit through the channeled portion of the head, said spout having the walls of its mouth relatively arranged to cause the flow of the air induced by the fan to be transversely through the material delivered to the mouth.

12. In combination, a grinding chamber, grinding elements therein, means forming separate discharge channels extending from the grinding chamber, means for creating a current of air through the material delivered by one of said channels, the other channel being arranged outside the sphere of influence of said current of air, and a cylindrical valve encircling the grinding chamber and having an opening arranged to open communication of the discharge channels with the grinding chamber in different positions of the valve, respectively.

13. In combination, a grinding chamber, a hopper having communication therewith, grinding elements in the grinding chamber, means forming separate discharge channels extending from the grinding chamber, means for creating a current of air through the material delivered by one of said channels, the other channel being arranged outside the sphere of influence of said current of air, and valvular means for controlling communication between the grinding chamber and the hopper and discharge channels, said valvular means being arranged to open communication of the grinding chamber with either of the discharge channels at will without closing communication between the grinding chamber and hopper, and also to close communication between the grinding chamber and the hopper and discharge channels.

14. In combination, a grinding chamber, a head mounted thereon, said head having a discharge channel and an air conducting channel whose inlet is adjacent to the outlet from the discharge channel, the head and grinding chamber having openings through which the discharge channel has communication with the grinding chamber, means for creating a current of air through the air conducting channel, a separate discharge channel which opens into the grinding chamber and is arranged outside the sphere of influence of the current of air, and a manually-adjustable approximately cup-shaped valve extending into the grinding chamber and having an apertured portion arranged to control communication of the grinding chamber with the discharge channels respectively in different positions of the valve.

15. In combination, a grinding chamber, a head mounted thereon, said head having a discharge channel and an air conducting channel whose inlet is adjacent to the outlet from the discharge channel, a hopper carried by the head, the head and grinding chamber having openings through which the discharge channel and hopper have communication with the grinding chamber, means for creating a current of air through the air conducting channel, a separate discharge channel which opens into the grinding chamber and is arranged outside the sphere of influence of the current of air, and a manually-adjustable approximately cup-shaped valve extending into the grinding chamber and having an apertured portion arranged to control communication of the grinding chamber with the discharge channels respectively in different positions of the valve and also to control communication of the grinding chamber with the hopper.

16. In combination, a grinding chamber having an opening through which it is supplied with material to be ground and also having a plurality of openings through either of which the ground material may be discharged, and a manually-adjustable valve so arranged that when in certain positions it will close one or the other of the discharge openings, respectively, without closing the inlet opening and when in another position it will close all the openings at once.

17. In combination, a grinding chamber having an opening through which it is supplied with material to be ground and also having a plurality of openings through either of which the ground material may be discharged, and an approximately cup-shaped manually-adjustable valve which extends into the grinding chamber and closes one end of the same, said valve having its portion within the grinding chamber formed with apertures so arranged that when the valve is in certain positions it will close one or the other of the discharge openings, respectively, without closing the inlet opening and when in another position it will close all the openings at once.

18. In combination, a grinding chamber, grinding elements therein, a head mounted on the grinding chamber, said head having a discharge channel and an air conducting channel whose inlet is adjacent to the outlet from the discharge channel, a hopper carried by the head, the head and grinding chamber having openings through which the discharge channel and hopper have communication with the grinding chamber, means for creating a current of air through the air conducting channel, a separate discharge channel which opens into the grinding chamber and is arranged outside the sphere of influence of the current of air, and a manually adjustable valve having a portion which closes one end of the grinding chamber and another portion which extends into the grinding chamber and encircles the grinding elements, the latter portion of the valve having apertures arranged to open communication of the grinding chamber with either of the discharge channels at will without closing communication between the grinding chamber and the hopper or to close communication between the grinding chamber and the hopper and both discharge channels when desired.

19. In combination, a grinding chamber, a head mounted thereon, said head having a discharge channel, the head and grinding chamber having registering openings, and an approximately cup-shaped valve which extends into the grinding chamber and closes one end of the latter and has means for opening and closing the registering openings in the head and grinding chamber.

20. In combination, a grinding chamber, grinding elements therein, one of said grinding elements being rotatably mounted, a manually-adjustable valve having a hollow portion which is arranged in the grinding chamber adjacent to the wall of the latter, a member mounted in said valve and having one or more blades for facilitating the discharge of the ground material, and means for rotating said member and the rotative grinding element.

21. In combination, a grinding chamber, grinding elements therein, one of said grinding elements being rotatably mounted, an approximately cup-shaped manually adjustable valve which closes one end of the grinding chamber and extends into the same, a member mounted in said valve and having one or more blades for facilitating the discharge of the ground material, and means for rotating said member and the rotative grinding element.

22. In combination, a grinding chamber, grinding elements therein, one of said grinding elements being rotatably mounted, a rotative member having one or more blades for facilitating the discharge of the ground material from the grinding chamber, means for connecting the rotative grinding element to said member, said means being arranged to release said member from the rotative grinding element automatically when the rotation of the latter is obstructed, and a driving mechanism connected to said member.

23. In combination, a grinding chamber, grinding elements therein, one of said grinding elements being rotatably mounted, a manually-adjustable approximately cup-shaped valve which closes one end of the grinding chamber and extends into the same, a rotative member mounted in said valve and having one or more blades for facilitating the discharge of the ground material, means for connecting the rotative grinding element to said member, said means being arranged to release said member from the rotative grinding element automatically when the rotation of the latter is obstructed, and a driving mechanism connected to said member.

24. In a coffee mill, a runner bur, operating means carrying the runner bur arranged to cause the runner bur to revolve with the center of gravity of the runner bur coincident with the axis of revolution of the operating means, a stationary bur, and means to hold the axis of the stationary bur in constant fixed alinement.

25. In a coffee mill, a runner bur, a stationary bur and means for adjustably supporting the stationary bur and maintaining its alinement, the said means including an element which is supported to move with the stationary bur and coöperating guiding members engaging the inner and outer surfaces of said element.

26. In a coffee mill, a runner bur, a stationary bur, a support for the stationary bur, said support being slidably adjustable with the stationary bur relatively to the runner bur and having a flange, and means engaging the inner and outer surfaces of the flange and coöperating therewith to guide the support in its adjustment and maintain alinement of the stationary bur with respect to the runner bur.

27. In a coffee mill, a grinding chamber, a runner bur, a stationary bur and means for adjustably supporting the stationary bur and maintaining its alinement, the said means including a flange which is slidably adjustable with the stationary bur and has its outer surface engaged with the wall of the grinding chamber and a guiding member engaging the inner surface of said flange.

28. In a coffee mill, a runner bur, a stationary bur, a longitudinally movable shaft having connection with the stationary bur and arranged with its axis coincident with the axis of the runner bur, an axially movable adjusting member, means for adjusting the shaft and stationary bur when the adjusting member is moved axially, a guiding element movable with the stationary bur, and means engaging the outer and inner surfaces of the guiding element and coöperating therewith to guide the stationary bur and maintain the alinement of the latter with respect to the runner bur.

29. In a coffee mill, a grinding chamber, a runner bur and a stationary bur mounted therein, a support for the stationary bur having a flange closely fitted to the surface of the grinding chamber, means for adjusting the stationary bur and support relatively to the runner bur, and a closure for the end of the grinding chamber, said closure being fitted in the flange of the support and serving as a guide therefor.

30. In a coffee mill, a grinding chamber, a runner bur and a stationary bur mounted therein, a support for the stationary bur having a flange closely fitted to the surface of the grinding chamber, a closure for the end of the grinding chamber, said closure being fitted in the flange of the support and serving as a guide therefor, and means for adjusting the stationary bur and support relatively to the runner bur, said means including a member which extends through said closure and is movable axially and means whereby axial movement of said member causes the stationary bur and support to move slidably.

31. In a coffee mill, a runner bur, a stationary bur, a support for the stationary bur, a shaft connected with the support, an axially movable adjusting element, connections between said element and shaft for moving the latter longitudinally when the adjusting element is moved axially, and means for maintaining alinement during such adjustment, the said means comprising a guide flange which extends from the support and means forming a space into which said flange projects, with walls engaging the inner and outer surfaces of the flange.

32. In a coffee mill, a grinding chamber, a runner bur, a stationary bur, a support for the stationary bur, the said support having a flange which is fitted to the wall of the grinding chamber, a member closing the end of the grinding chamber and fitted to said flange to form a grinding element therefor, a shaft extending from the support, and means for moving the shaft and support longitudinally, the said means including an axially-movable adjusting element which extends through the closure at the end of the grinding chamber and is held against longitudinal movement and connections between the adjusting member and shaft, adapted to cause the latter to move longitudinally when the adjusting element is moved axially.

33. A motor having a shaft and a casing member, a sleeve extending from one end of the motor casing and having a part forming a grinding chamber, the shaft of the motor extending into the grinding chamber and being axially coincident with the chamber, a runner bur fixed to the shaft in the grinding chamber and axially coincident with the sleeve and shaft, a stationary bur in the grinding chamber and axially coincident with the sleeve and shaft, a stationary bur in the grinding chamber, a support for the stationary bur having a flange fitted to the wall of the grinding chamber, said support and stationary bur being axially coincident with the chamber and shaft, a second shaft extending through the stationary bur and support and carrying means for clamping the stationary bur to the support, said support being movable longitudinally of the sleeve, a guide sleeve secured to the first sleeve and fitted within the flange of the support, and means carried by the guide sleeve and coöperating with the second shaft to adjust the support and stationary bur with respect to the movable bur.

34. A motor having a shaft and a casing member, a sleeve extending from one end of the motor casing and having a part forming a grinding chamber, the shaft of the motor extending into the grinding chamber and being axially coincident with the chamber, a runner bur fixed to the shaft in the grinding chamber and axially coincident with the sleeve and shaft, a stationary bur in the grinding chamber and axially coincident with the sleeve and shaft, a stationary bur in the grinding chamber, a support for the stationary bur having a flange fitted to the wall of the grinding chamber, the support having a seat wherein said stationary bur is fitted, said support and stationary bur being axially coincident with the chamber and shaft, a second shaft extending through the stationary bur and support and carrying means for clamping the stationary bur to the support, said support being movable longitudinally of the sleeve, a guide sleeve secured to the first sleeve and fitted within the flange of the support, and means carried by the guide sleeve and coöperating with the second shaft to adjust the support and stationary bur with respect to the movable bur.

35. A motor having a shaft, and a casing member, a sleeve extending from one end of the motor casing and having a part forming a grinding chamber, a second sleeve extending from the other end of the motor casing and forming a fan chamber, the shaft of the motor extending into the grinding and fan chambers, and being axially coincident with the chambers, a runner bur fixed to the shaft in the grinding chamber and axially coincident with the sleeves and shaft, a fan fixed to the shaft in the fan chamber and axially coincident with the sleeves and shaft, a stationary bur in the grinding chamber, a support for the stationary bur having a flange fitted to the wall of the grinding chamber, the support having a seat wherein said stationary bur is fitted, said support and stationary bur being axially coincident with the chambers and shaft, a second shaft extending through the stationary bur and support and carrying means for clamping the stationary bur to the support, said support being movable longitudinally of the sleeve, a guide sleeve secured to the first sleeve and fitted within the flange of the support, and means carried by the guide sleeve and coöperating with the second shaft to adjust the support and stationary bur with respect to the movable bur.

36. A motor having a shaft and a casing member, a sleeve extending from one end of the motor casing and having a part forming a grinding chamber, a second sleeve extending from the other end of the motor casing and forming a fan chamber, the shaft of the motor extending into the grinding and fan chambers and being axially coincident with the chambers, a runner bur fixed to the shaft in the grinding chamber and axially coincident with the sleeves and shaft, a fan fixed to the shaft in the fan chamber and axially coincident with the sleeves and shaft, a stationary bur in the grinding chamber, a support for the stationary bur having a flange fitted to the wall of the grinding chamber, said support and stationary bur being axially coincident with the chambers and shaft, a second shaft extending through the stationary bur and support and carrying means for clamping the stationary bur to the support, said support being movable longitudinally of the sleeve, a guide sleeve secured to the first sleeve and fitted within the flange of the support, and means carried by the guide sleeve and coöperating with the second shaft to adjust the support and stationary bur with respect to the movable bur.

In testimony whereof we have hereunto set our hands each in the presence of two subscribing witnesses.

FRANK F. WEAR.
BERNARD M. ELY.

Witnesses to Wear's signature:
H. J. LINN,
G. E. BEEBE.
Witnesses to Ely's signature:
E. PAINE BONHEIM,
RUSSELL L. COOK.